United States Patent [19]

Senuma et al.

[11] Patent Number: 4,501,711

[45] Date of Patent: Feb. 26, 1985

[54] PROCESS AND COMPOSITION FOR PRODUCING OPEN-CELL CROSS LINKED POLYOLEFIN FILM

[75] Inventors: Akitaka Senuma; Yoshihiko Shimizu; Kiroku Tsukada, all of Yokohama, Japan

[73] Assignee: Union Carbide Corporation, Danbury, Conn.

[21] Appl. No.: 610,593

[22] Filed: May 15, 1984

[51] Int. Cl.$^3$ .............................................. B29H 7/20
[52] U.S. Cl. ............................... 264/54; 264/DIG. 5; 264/DIG. 13; 264/DIG. 18; 521/91; 521/96; 521/139; 521/140; 521/154; 521/79; 521/81

[58] Field of Search .......... 264/54, DIG. 18, DIG. 5, 264/DIG. 13; 521/91, 96, 139, 140, 79, 81

[56] References Cited

U.S. PATENT DOCUMENTS 4,424,181 1/1984 Senuma et al. ..................... 521/140

Primary Examiner—Morton Foelak
Attorney, Agent, or Firm—Clement J. Vicari

[57] ABSTRACT

Process and composition for single step production of foam by utilizing a blowing agent, organic peroxide cross linking agent and a silicone block copolymer.

2 Claims, No Drawings

4,501,711

PROCESS AND COMPOSITION FOR PRODUCING OPEN-CELL CROSS LINKED POLYOLEFIN FILM

BACKGROUND OF THE INVENTION

The present invention relates to a composition suitable for producing open-cell polyolefin resin foam. In another aspect, the present invention relates to a process for the single step production of open-cell cross-linked polyolefin resin foam from such composition.

DESCRIPTION OF THE PRIOR ART

Foams of ethylene polymer are used in large quantities as heat insulating materials, packaging materials, and cushioning materials. They are mostly of the closed-cell type which are not suitable for applications where water absorptivity and breathability are required. Breathable, open-cell foams which are available in limited quantities are coarse in cell size, poor in hand, and are used for limited applications.

According to the known conventional process for the production of open-cell polyethylene foam, a closed-cell foam is first prepared and subsequently the cells are broken by expansion with heating. This process gives rise to a foam which lacks resiliency and causes "bottom-out". In addition, uniform cell opening is difficult to achieve and the resulting cells are coarse in size. To remedy this drawback, a process was developed by which closed cells are opened by pressing. Unfortunately, the process disadvantages are that two steps are required, the resulting foam is thin, and the broken cell walls remain unremoved, making the foam poor in water absorption and breathability.

To overcome these shortcomings, there was proposed an improved process in Japanese Pat. No. 47-31695, which comprises the steps of cooling a closed-cell foam to a temperature under or in the neighborhood of the glass transition point and subsequently compressing the foam to rupture its cell membranes. This process needs expensive equipment and coolant such as liquified nitrogen is required.

Japanese Pat. No. 55-42100 discloses another process for preparing an open-cell polyethylene foam in one step by pressing and heating a mixture of polyethylene, blowing agent, crosslinking agent, and a large quantity of amorphous polypropylene. According to this disclosure, the amorphous polypropylene should preferably be incorporated in an amount from 30 to 50 wt% and that when the quantity is less than 20 wt%, the ratio of open cells decrease. The use of amorphous polypropylene is of industrial significance because it is a by-product in the production of crystalline polypropylene and was previously discarded as a material of no commercial value. Amorphous polypropylene is a viscous clay-like material at room temperature which is difficult to mold when used alone. It has been used as a bulking filler added in small quantities to low-priced foams. In such use, the incorporation of large quantities as mentioned above will adversely affect the mechanical properties and hand of the resulting foams.

The disclosure of Japanese Pat. Laid-Open No. 54-63172 is characterized in that 100 parts by weight of polyolefin resin is compounded with 30 to 300 parts by weight of inorganic powder and the composition is allowed to expand to make closed-cell foam, and subsequently the closed cells are ruptured by deformation. This patent discloses that the foam is made to open more easily if the inorganic filler undergoes surface treatment which decreases the bond strength between the inorganic material and polymer. This means that it is necessary to incorporate a large amount of inorganic substance in order to accomplish the rupture of the foam cells. It can be easily conjectured that the presence of an inorganic substance will make the foam different from the original polyethylene foam in mechanical properties and hand feel. This indicates how difficult it is to make open-cell foams from a polyolefin.

More recently, it has been proposed in U.S. Pat. No. 4,424,181 issued Jan. 3, 1984 and assigned to a common assignee to provide a composition suitable for open-cell polyolefin foam which comprises 100 parts by weight of olefin resin, 1 to 20 parts by weight of blowing agent, 0.3 to 10 parts by weight of organic peroxide cross-linking agent, 0.1 to 10 parts by weight of trifunctional monomer, and 1 to 5 parts by weight of silicone oil or a derivative thereof, said organic peroxide having a 10-minute half-value temperature ($T_p$) of 110° C. to 170° C. and said blowing agent having a decomposition temperature ($T_f$) of 100° C. to 160° C., $T_p$ and $T_f$ satisfying the following equation $$-10°\ C. \leq T_p - T_f \leq 50°\ C.$$

As mentioned in said aforementioned U.S. Patent, the relationship between the decomposition temperature of the blowing agent and the decomposition temperature of the crosslinking agent is inverted from that in the conventional technology. Secondly, the cells before and after rupture are made fine and uniform in size by adding a small quantity of a trifunctional compound and silicone oil or a derivative thereof. Thirdly, the foam can be produced batchwise in a furnace as well as continuously. Finally, the composition before foaming may be in the form of pellets, powder, film, sheet, and other shapes of moldings.

This invention is an improvement over the invention disclosed in U.S. Pat. No. 4,424,181. The instant invention does not require that a trifunctional reactive monomer be present in the composition to provide the excellent results achieved. Moreover, in lieu of the silicone oil there is substituted a silicone block copolymer.

It is therefore an object of this invention to provide an improvement in the composition and process of the aforementioned U.S. Pat. No. 4,424,181 and to provide an open-cell foam which is outstanding in breathability, water absorption, weather resistance, flexibility, and hand which are attributable to the open-cell structure. The process according to the present invention permits the production of open-cell foam by a single heating step without the need for a crushing step to open cells. The foam of this invention will find use in cushions, pillows, mats, winter clothes, carpet backing, balls, toys, supporters, filters, heat insulators, sound absorbers, and the like.

It is another object of the invention to provide a process which permits the production of open-cell foam by a single heating step, without the need for a crushing step to open cells.

SUMMARY OF THE INVENTION

Broadly contemplated the present invention provides a composition suitable for open-cell polyolefin foam which comprises 100 parts by weight of olefin resin, 1 to 20 parts by weight of blowing agent, 0.3 to 10 parts by weight of organic peroxide crosslinking agent, and 0.1 to 5 parts by weight of a silicone block copolymer of the formula:

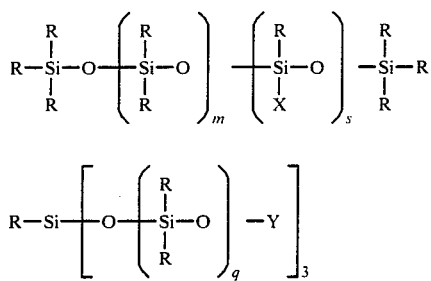

wherein
R is a monofunctional hydrocarbon group;
X is $-(O)_p-(C_nH_{2n}O)_t-R'$
R' is H, alkyl, allyl, aralkyl, or carbamyl group
p is 0 or 1
Y is $(C_nH_{2n}O)_t-R'$
m is 0 to 300
n is 2 to 10
s is 1 to 30
q is 1 to 300
t is 1 to 100
and wherein: $(C_nH_{2n}O)$ is an oxyalkylene radical or mixtures of such radicals, said organic peroxide having a 10-minute half-value temperature ($T_p$) of 100° C. to 170° C. and said blowing agent having a decomposition temperature ($T_f$) of 90° C. to 160° C., $T_p$ and $T_f$ satisfying the following equation:

$$-10° C. \leq T_p - T_f \leq 50° C.$$

In another aspect there is provided a process for producing open-cell crosslinked polyolefin foam which comprises forming a composition comprising 100 parts by weight of olefin resin, 1 to 20 parts by weight of blowing agent, 0.3 to 10 parts by weight of organic peroxide crosslinking agent, and 0.1 to 5 parts by weight of a silicone block copolymer of the formula:

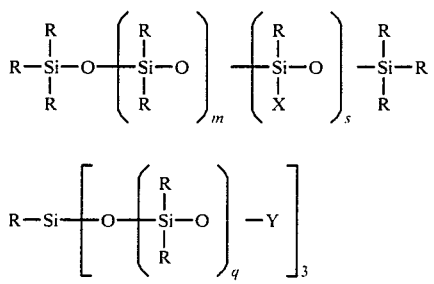

wherein
R is a monofunctional hydrocarbon group;
X is $-(O)_p-(C_nH_{2n}O)_t-R'$
R' is H, alkyl, allyl, aralkyl, or carbamyl group
p is 0 or 1
Y is $(C_nH_{2n}O)_t-R'$
m is 0 to 300
n is 2 to 10
s is 1 to 30
q is 1 to 300
t is 1 to 100
and wherein: $(C_nH_{2n}O)$ is an oxyalkylene radical or mixtures of such radicals, said organic peroxide having a 10-minute half-value temperature ($T_p$) of 100° C. to 170° C. and said blowing agent having a decomposition temperature ($T_f$) of 90° C. to 160° C., $T_p$ and $T_f$ satisfying the following equation:

$$-10° C. \leq T_p - T_f \leq 50° C.$$

molding said composition into pellets, powder, film or sheets, and subsequently heating said moldings in a single step.

DETAILED DESCRIPTION OF THE INVENTION

The fact that the foaming composition of this invention may take any form means that open-cell foams can be produced from pellets, powder, film or sheet and that the foams can be produced in a continuous inline process. For instance, a thus foamed sheet can be produced by forming the compound into a thin sheet and subsequently passing the film through a heating furnace. A thick foam sheet can be produced by passing pellets scattered in a single layer through a heating furnace. These processes are more productive than the conventional process in which a bulk foam is prepared first and then the bulk is sliced into thin foam sheets.

In the technology of this invention it is essential that the mixing to obtain the compound using an extruder or kneader should be performed at a temperature at which the crosslinking agent and blowing agent do not decompose substantially. According to the process of this invention, it is also possible to make open-cell foams by preparing at first a powder or liquid additives to a polyolefin resin and then heating the composition.

The foam resulting from the process of this invention has a very fine and uniform cell structure compared with the cell structure obtained according to U.S. Pat. No. 4,424,181. The principle which made possible the production of open and fine cells has not been elucidated completely. Presumably, this has resulted from the combination of (a) the addition of the silicone block copolymer defined herein and (b) the unique reaction mechanism which is inverse to the conventional process with respect to the selection of blowing agent and crosslinking agent.

It is one of the characteristics of this invention to provide foams having superior weatherability which keeps the foam intact after outdoor exposure for six months.

Ethylene polymer as used in this invention means a polymer consisting mainly of ethylene, and includes ethylene-vinyl ester copolymers, ethylene-alkyl acrylate copolymers, ethylene-propylene copolymers, and ethylene-alpha-olefin copolymers.

The organic peroxide used in the process of this invention has a 10-minute half-value temperature of 100° C. to 170° C., and includes the following as examples. (Parenthesized number indicates the decomposition temperature in °C.).

Succinic acid peroxide (110), benzoyl peroxide (110), t-butyl peroxy-2-ethyl hexanoate (113), p-chlorobenzoyl peroxide (115), t-butyl peroxy-isobutylate (115), t-butylperoxyisopropylcarbonate (135), t-butyl peroxy laurate (140), 2,5-dimethyl-2,5-di(benzoylperoxy)hexane (140), t-butyl peroxy acetate (140), di-t-butyldiperoxyphthlate (140), t-dibutylperoxy maleic acid (140) cyclohexanone peroxide (145), t-butyl peroxy benxoate (145), methyl ethyl ketone peroxide (150), dicumyl peroxide (150), 2,5-dimethyl-2,5-di(t-butyl-peroxy)hexane (155), t-butyl cumyl peroxide (155), t-butyl hydroperoxide (158), di-t-butyl peroxide (160), and 2,5-dimethyl 2,5-di(t-butylperoxy)hexane-3 (170).

The blowing agents used in this invention have a decomposition temperature from 90° C. to 160° C. and the decomposition temperature can be adjusted to this range by the combined use with an accelerator or adjuvant. Examples of such blowing agents are azobisisobutylonitrile, diazocarbonamide (with adjuvant), p-toluenesulfonyl-hydrazide (with adjuvant), and 4,4'-oxybis(benzenesulfonylhydrozide) (with adjuvant), n-heptane, n-octane, n-nonane and n-decane.

The organic peroxide and the blowing agent should be combined so that the following conditions are satisfied.

$$-10° C. \leq \Delta T \leq 50° C. (\Delta T = T_p - T_f)$$

where $T_p$ is the decomposition temperature of the organic peroxide for half value in 10 minutes, and $T_f$ is the blowing temperature of the blowing agent. A crosslinking agent and a blowing agent which satisfy the above conditions are added in combination with a silicone block copolymer to an ethylene polymer. When the resulting composition is heated under normal pressure, foaming takes place and simultaneously or a little later crosslinking takes place slowly. When blowing is complete, or immediately before the completion of blowing, the degree of crosslinking increases rapidly, making the open cells (containing some closed cells in some cases) stable. Upon cooling, the cells are fixed.

If $\Delta T > -10°$ C., crosslinking takes place predominantly when the composition is heated, and blowing takes place very little or to such an extent that the resulting cells are closed.

If $\Delta T > 50°$ C., blowing takes place predominantly and resulting cells are unstable.

The silicone block copolymer used in this invention in effect makes cells extremely fine and uniform in size.

The ethylene polymer used in this invention has a melt index higher than 1. Ethylene polymers having a melt index lower than 1 will not melt when heated or will cause discoloration and scorching.

The preferable contents of each component for the composition are given below. The organic peroxide is 0.3 to 10 parts by weight based on 100 parts by weight of ethylene polymer. When less than 0.3 parts by weight, the composition does not increase in viscosity during foaming, and the foam is liable to collapse. When used more than 10 parts by weight, the crosslinking efficiency levels off.

The amount of blowing agent required is generally in an amount from 1 to 20 parts by weight. When used under 1 part by weight, the blowing agent does not accomplish effective foaming, and when used above 20 parts by weight, the blowing agent gives off excessive decomposition product which dissipates wastefully into the atmosphere.

The silicone block copolymer can be used in an amount of from 0.1 to 5 parts by weight. When used under 0.1 part by weight the silicone block copolymer has no effect to impart the uniform, fine cell structure; and above 5 parts by weight, the silicone block copolymer oozes out excessively.

The composition of this invention may be incorporated, if required, with an antioxidant, UV stabilizer, inorganic filler, pigment, flame retardant, plasticizer, and other additives and resins and elastomers.

The composition of this invention is heated to a temperature at which both foaming and crosslinking takes place. More particularly, the temperature is between 120° C. and 250° C.

The decomposition temperature of the organic peroxide in this invention is indicated by the temperature at which a pure product decomposes by half for 10 minutes. Therefore, crosslinking in actual process takes place under this temperature.

The heating time in this invention is 1 to 60 minutes in which an open-cell foam is formed.

In the process of this invention, the foam is cooled, after heating, below 50° C. to fix the foam structure.

Heating is accomplished by subjecting the composition to heated gas (air), heated metal (iron or aluminum), infrared rays, burner, electric heater, high frequency, and the like in the atmosphere or under pressure.

The invention will be further described with reference to examples that follow.

EXAMPLE 1

A foamable composition was prepared by mixing, followed by pelleting, the following components using a Banbury mixer at 70° C. for 5 minutes.
(1) Ethylene-vinyl acetate copolymer (MI=30, VA content=35 wt.%, made by Nippon Unicar Co., Ltd) . . . 100 parts by weight
(2) Diazo carbon amide (foaming temperature=130° C.) . . . 5 parts by weight
(3) Dicumyl peroxide (decomposition temperature=150° C.) . . . 1 part by weight
(4) Silicone block copolymer (L-720, 1100 CS, made by Nippon Unicar Co., Ltd.) . . . 1 part by weight The resulting pellets were compression molded into a 0.2 mm thick sheet at 80° C. and 100 kg/cm² for 5 minutes. This sheet, held on a polyester sheet, was placed for 10 minutes in an oven heated to 130° C. to permit the sheet to expand into a uniform foam. After 5 minutes post curing, the foam was removed from the oven and allowed to stand at room temperature. A 3-mm thick soft, open-cell, white foam was obtained. This foam was found to have cell size of 0.08 mm, apparent secant modulas of 30 kg/cm², and hardness of 30 measured on a hardness tester (type C). This foam had an apparent density of 165 kg/m³, and picked up 0.63 g of water per 1 cm³ when dipped in water. After outdoor exposure test for 6 months, this foam did not show any sign of degradation such as discoloration and cracking.

EXAMPLE 2

Powder having average particle size of 40 mesh prepared by crushing ethylene-vinyl acetate copolymer (made by Nippon Unicar Co., Ltd.) having a melt index of 20 and containing 28 wt% of vinyl acetate. A hundred parts by weight of this powder was compounded with 7 parts of azodicarbonamide (blowing temperature: 135° C.) containing an assistant, 1 part of t-butyl-peroxyisopropyl carbonate (decomposition temperature: 135° C.), and 1 part of silicone block copolymer L-6202 made by Nippon Unicar Co., Ltd.) using a supermixer for 15 minutes, followed by standing for one day.

This powder composition was placed in a petri dish in an amount of 6 g. The powder in the petri dish was heated at 180° C. for 8 minutes in an oven, followed by standing for 10 minutes. A white, uniform foam, 2 cm thick and 7 cm in diameter, was obtained. It was found that this foam is of open cell structure having a cell size of 0.10 mm (0.08 to 0.12 mm).

EXAMPLE 3

A foamable compound was prepared by compounding 100 parts by weight of ethylene-ethyl acrylate copolymer (made by Nippon Unicar Co., Ltd.) having a melt index of 20 and containing 20 wt% of ethyl acrylate, with 10 parts of azodicarbonamide (blowing temperature: 130° C.) containing an assistant, 1 part of dicumyl peroxide (decomposition temperature: 150° C.), and 1 part of silicone block copolymer L 720, (made by Nippon Unicar Co., Ltd.) using a Banbury mixer at 80° C. for 5 minutes, followed by pelletization.

The resulting pellets were compression molded into a 1-mm thick sheet at 90° C. and 100 kg/cm$^2$ for 5 minutes. This sheet, held on a 200-mesh wire netting, was placed for 7 minutes in an oven heated to 180° C. to permit the sheet to expand into a uniform foam. After 15-minute post curing, the foam was removed from the oven and allowed to stand at room temperature. A 3 mm thick white open-cell foam was obtained. This foam was found to have cell size of 0.3 mm, an apparent density of 150 kg/m$^3$, and hardness of 55 measured on a hardness tester (type C). This foam absorbed 0.6 g of water per 1 cm$^3$ of volume when dipped in water.

EXAMPLE 4

A foamable compound was prepared by compounding 100 parts by weight of low-density polyethylene (made by Nippon Unicar Co., Ltd.) having a melt index of 8.0 and density of 0.918, with 5 parts of azodicarbonamide (blowing temperature: 145° C.) containing an assistant, 1 part of 2,5-dimethyl-2,5-di(t-butyl peroxy)hexane (decomposition temperature: 155° C.), and a 1 part of silicone block copolymer L-520 made by Nippon Unicar Co., Ltd.) using a Banbury mixer at 110° C. for 5 minutes, followed by pelletization.

The resulting pellets were compression molded into a 20-mm thick sheet at 120° C. and 100 kg/cm$^2$ for 5 minutes. This sheet, held on a 200-mesh wire meeting, was placed for 10 minutes in an oven heated to 190° C. to permit the sheet to expand to a uniform foam. After 10 minute post curing, the foam was removed from the oven and allowed to stand at room temperature. A 6-mm thick open-cell foam was obtained. This foam was found to have an average cell size of 0.4 mm, an apparent density of 118 kg/m$^3$, and hardness of 70 measured on a hardness tester (type C). This foam absorbed 0.5 g of water per 1 cm$^3$ of volume when dipped in water.

EXAMPLE 5

A foamable composition was prepared by mixing, followed by pelleting, the following components using a Roll mill at 70° C. for 40 minutes.
(1) Ethylene-vinyl acetate copolymer (MI=30, VA content=35 wt.%, made by Nippon Unicar Co., Ltd.) . . . 100 parts by weight
(2) Azo-dicarbonamide (foaming temperature=130° C.) . . . 5 parts by weight
(3) Dicumyl peroxide (decomposition temperature=150° C.) . . . 1 part by weight
(4) Silicone block copolymer L-7001 made by Nippon Unicar Co., Ltd. . . . 1 part by weight The resulting pellets were compression molded into a 0.2 mm thick sheet at 80° C. and 100 kg/cm$^2$ for 5 minutes. This sheet, held on a polyester sheet, was placed for 5 minutes in an oven heated to 180° C. to permit the sheet to expand into a uniform foam. After 10-minute post curing, the foam was removed from the oven and allowed to stand at room temperature. A 0.7 mm thick soft, open-cell, white foam was obtained. This foam was found to have cell size of 0.08 mm (0.06 to 0.10 mm), apparent secant modulas of 30 kg/cm$^2$, and hardness of 30 measured on a hardness tester (type C). This foam had an apparent density of 280 kg/m$^3$, and picked up 0.63 g of water per 1 cm$^3$ when dipped in water. After outdoor exposure test for 6 months, this foam did not show any sign of degradation such as discoloration and cracking.

EXAMPLE 6

Powder having average particle size of 40 mesh was prepared by crushing ethylene-vinyl acetate copolymer (made by Nippon Unicar Co., Ltd.) having a melt index of 20 and containing 28 wt.% of vinyl acetate. A hundred parts by weight of this powder was compounded with 7 parts of azodicarbonamide (blowing temperature: 135° C.) containing an assistant, 1 part of t-buytl-peroxyisopropyl carbonate(decomposition temperature: 135° C.), and 1 part of silicone block copolymer L-5340 (made by Nippon Unicar Co., Ltd.) using a supermixer for 15 minutes, followed by standing for one day.

This powder composition was placed in a petri dish in an amount of 6 g. The powder in the petri dish was heated at 140° C. for 7 minutes in an oven, followed by standing for 10 minutes. A white, uniform foam, 2 cm thick and 7 cm in diameter, was obtained. It was found that this foam is of open-cell structure having a cell size of 0.10 mm (0.08 to 0.12 mm).

EXAMPLE 7

A foamable compound was prepared by compounding 100 parts by weight of ethylene-ethyl acrylate copolymer (made by Nippon Unicar Co., Ltd.) having a melt index of 20 and containing 20 wt.% of ethyl acrylate, with 10 parts of azodicarbonamide (blowing temperature: 130° C.) containing an assistant, 1 part of dicumyl peroxide (decomposition temperature: 150° C.), 1 part of triallylcyanurate, and 1 part of silicone block copolymer L-7602 (made by Nippon Unicar Co., Ltd.) using a Banbury mixer at 80° C. for 5 minutes, followed by pelletization.

The resulting pellets were compression molded into a 1-mm thick sheet at 90° C. and 100 kg/cm$^2$ for 5 minutes. This sheet, held on a 200-mesh wire netting, was placed for 7 minutes in an oven heated to 180° C. to permit the sheet to expand into a uniform foam. After 15 minute post curing, the foam was removed from the oven and allowed to stand at room temperature. A 3-mm thick white open-cell foam was obtained. This foam was found to have cell size of 0.3 mm. This foam absorbed 0.6 g of water per 1 cm$^3$ of volume when dipped in water.

EXAMPLE 8

A foamable compound was prepared by compounding 100 parts by weight of linear low-density polyethylene (made by Nippon Unicar Co., Ltd.) having a melt index of 8.0 and a density of 0.918, with 5 parts of azodicarbonamide (blowing temperature: 145° C.) containing an assistant, 1 part of 2,5-dimethyl-2,5-di(t-butyl peroxy)hexane (decomposition temperature: 155° C.), 1 part of triallyltrimellitate, and 1 part of silicone block copolymer (made by Nippon Unicar Co., Ltd.) using a Banbury mixer at 110° C. for 5 minutes, followed by pelletization.

The resulting pellets were compression molded into a 20-mm thick sheet at 120° C. and 100 kg/cm² for 5 minutes. This sheet, held on a 200-mesh wire netting, was placed for 10 minutes in an oven heated to 190° C. to permit the sheet to expand into a uniform foam. After 10 minute post curing, the foam was removed from the oven and allowed to stand at room temperature. A 6-mm thick open-cell foam was obtained. This foam was found to have an average cell size of 0.8 mm (0.4 to 0.8 mm), an apparent density of 118 kg/m³, and hardness of 70 measured on a hardness tester (type C). This foam absorbed 0.5 g of water per 1 cm³ of volume when dipped in water.

COMPARATIVE EXAMPLE 1

A foamable composition was prepared by mixing, followed by pelleting, the following components using a Banbury mixer at 70° C. for 5 minutes.
(1) Ethylene-vinyl acetate copolymer (MI=100, VA contents=28 wt.%, made by Nippon Unicar Co., Ltd.) ... 100 parts by weight.
(2) Azo-bisisobutyronitrile (foaming temperature=100° C.) ... 5 parts by weight.
(3) t-Butyl peroxyisopropyl carbonate (decomposition temperature=135° C.) ... 1 part by weight.
(4) Triallyl trimellitate ... 1 part by weight.
(5) Silicone oil (10 cSt, made by Nippon Unicar Co., Ltd.) ... 1 part by weight.

The resulting pellets were compression molded into a 1 mm thick sheet at 70° C. and 50 kg/cm² for 2 minutes. This sheet, held on a 200-mesh wire netting, was placed for 10-minutes in an oven heated to 130° C. to permit the sheet to expand into a uniform foam. After 10 minutes post curing, the foam was removed from the oven and allowed to stand at room temperature. A 3-mm thick soft, open-cell, white foam was obtained. This foam was found to have cell size of 0.2 mm (0.17 to 0.23 mm), apparent secant modulas of 30 kg/cm², and hardness of 30 measured on a hardness tester (type C). This foam had an apparent density of 165 kg/m³, and picked up 0.65 g of water per B 1 cm³ when dipped in water. After outdoor exposure test for 6 months, this foam did not show any sign of degradation such as discoloration and cracking.

COMPARATIVE EXAMPLE 2

Powder having average particle size of 40 mesh was prepared by crushing ethylene-vinyl acetate copolymer (made by Nippon Unicar Co., Ltd.) having a melt index of 20 and containing 28 wt.% of vinyl acetate. A hundred parts by weight of this powder was compounded with 7 parts of azodicarbonamide (foaming temperature: 135° C.) containing an assistant, 1 part of t-butyl-peroxyisopropyl carbonate (decomposition temperature: 135° C.), 1 part of triallylcyanurate, and 1 part of silicone oil (20 cSt, made by Nippon Unicar Co., Ltd.) using a supermixer for 10 minutes, followed by standing for one day.

This powder composition was placed in a petri dish in an amount of 6 g. The powder in the petri dish was heated at 140° C. for 7 minutes in an oven, followed by standing for 10 minutes. A white, uniform foam, 2 cm thick and 7 cm in diameter, was obtained. It was found that this foam is of open-cell structure having a cell size of 0.2 mm (0.17–0.23 mm) and has resilience of 35 when measured with a hardness tester (type C). The apparent density of this foam was 155 kg/m³.

COMPARATIVE EXAMPLE 3

A foamable compound was prepared by compounding 100 parts by weight of ethylene ethyl acrylate copolymer (made by Nippon Unicar Co., Ltd.) having a melt index of 6 and containing 20 wt.% of ethyl acrylate, with 10 parts of azodicarbonamide (blowing temperature: 135° C.) containing an assistant, 1 part of dicumyl peroxide (decomposition temperature: 150° C.), 1 part of triallylcyanurate, and 1 part of silicone oil (20 cSt., made by Nippon Unicar Co., Ltd.) using a Banbury mixer at 90° C. for 5 minutes, followed by pelletization.

The resulting pellets were compression molded into a 1-mm thick sheet at 90° C. and 50 kg/cm² for 5 minutes. This sheet, held on a 200-mesh wire netting, was placed for 7 minutes in an oven heated to 180° C. to permit the sheet to expand into a uniform foam. After 15-minute post curing, the foam was removed from the oven and allowed to stand at room temperature. A 3-mm thick white open-cell foam was obtained. This foam was found to have cell size of 0.6 mm (0.4 to 0.8 mm), an apparent density of 150 kg/m³, and hardness of 55 measured on a hardness tester (type C). This foam absorbed 0.6 g of water per 1 cm³ of volume when dipped in water.

What is claimed is:
1. A composition suitable for open-cell polyolefin foam which consists essentially of 100 parts by weight of olefin resin, 1 to 20 parts by weight of blowing agent, 0.3 to 10 parts by weight of organic peroxide crosslinking agent and 0.1 to 5 parts by weight of a silicone block copolymer of the formula:

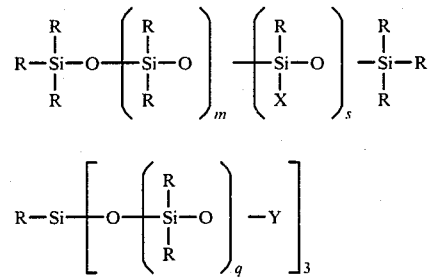

wherein
R is a monofunctional hydrocarbon group;
X is $-(O)_p-(C_nH_{2n}O)_t-R'$
R' is H, alkyl, allyl, aralkyl, or carbamyl group
p is 0 or 1
Y is $(C_nH_{2n}O)_t-R'$
m is 0 to 300
n is 2 to 10
s is 1 to 30
q is 1 to 300
t is 1 to 100
and wherein: $(C_nH_{2n}O)$ is an oxyalkylene radical or mixtures of such radicals. Said organic peroxide having a 10 minute half-value temperature ($T_p$) of 100° C. to 170° C. and said blowing agent having a decomposition temperature ($T_f$) of 90° C. to 160° C., $T_p$ and $T_f$ satisfying the following equation:

$$-10°\,C. \leq T_p - T_f \leq 50°\,C.$$

2. A process for producing open-cell crosslinked polyolefin foam which consists essentially of forming a composition comprising 100 parts by weight of olefin resin, 1 to 20 parts by weight of blowing agent, 0.3 to 10 parts by weight of organic peroxide crosslinking agent and 0.1 to 5 parts by weight of a silicone block copolymer of the formula:

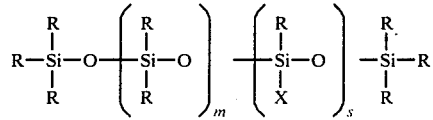

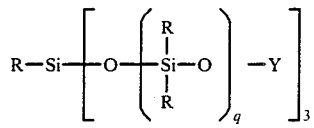

wherein
R is a monofunctional hydrocarbon group;
X is $-(O)_p-(C_nH_{2n}O)_t-R'$
R' is H, alkyl, allyl, aralkyl, or carbamyl group
p is 0 or 1
Y is $(C_nH_{2n}O)_t-R'$
m is 0 to 300
n is 2 to 10
s is 1 to 30
q is 1 to 300
t is 1 to 300 and wherein: $(C_nH_{2n}O)$ is an oxyalkylene radical or mixtures of such radicals. Said organic peroxide having 10 minute half-value temperature $(T_p)$ of 100° C. to 170° C. and said blowing agent having a decomposition temperature $(T_f)$ of 90° C. to 160° C., $T_p$ and $T_f$ satisfying the following equation:

$$-10°\,C. \leq T_p - T_f \leq 50°\,C.$$

molding said composition into pellets, powder, film or sheets, and subsequently heating said moldings in a single step.

* * * * *